(12) United States Patent
Lin et al.

(10) Patent No.: US 7,523,973 B2
(45) Date of Patent: Apr. 28, 2009

(54) THERMOFORMED LITTER SCOOP

(75) Inventors: Kevin Lin, Berkeley, CA (US); Jorge Robles, Stockton, CA (US); Jessica A. Scott, Dublin, CA (US)

(73) Assignee: The Clorox Company, Oakland, CA (US)

( * ) Notice: Subject to any disclaimer, the term of this patent is extended or adjusted under 35 U.S.C. 154(b) by 0 days.

(21) Appl. No.: 11/835,591

(22) Filed: Aug. 8, 2007

(65) Prior Publication Data

US 2009/0038553 A1     Feb. 12, 2009

(51) Int. Cl.
    *A01K 29/00*     (2006.01)
    *B07B 1/02*     (2006.01)

(52) U.S. Cl. ............................ 294/1.3; 294/55; 209/418

(58) Field of Classification Search ................ 294/1.3, 294/1.4, 55; 119/161; D30/162; D7/691, D7/692; D10/46.2; 209/417, 418; 30/325, 30/328

See application file for complete search history.

(56) References Cited

U.S. PATENT DOCUMENTS

| | | | | |
|---|---|---|---|---|
| 736,798 | A | * | 8/1903 | Stiefel ......................... 294/55 |
| 2,812,784 | A | * | 11/1957 | Palmer ......................... 141/98 |
| 4,458,932 | A | | 7/1984 | Resch |
| 4,536,910 | A | * | 8/1985 | Clark ........................ 15/245.1 |
| 4,969,675 | A | | 11/1990 | Zahrowski |
| D314,254 | S | * | 1/1991 | Gordon .................... D30/162 |
| 4,986,587 | A | | 1/1991 | Lozano |
| 5,076,627 | A | | 12/1991 | Simon |
| 5,137,316 | A | * | 8/1992 | Foos ............................. 294/55 |
| D330,997 | S | * | 11/1992 | Spahni et al. ................ D7/691 |
| D332,675 | S | | 1/1993 | Simon |
| 5,238,277 | A | | 8/1993 | Robinson |
| 5,536,055 | A | | 7/1996 | Kohn |
| 5,580,111 | A | | 12/1996 | Bohn |
| 5,601,321 | A | | 2/1997 | Simon |
| D387,514 | S | | 12/1997 | Savicki |
| 5,711,564 | A | | 1/1998 | Campbell |
| 5,738,399 | A | | 4/1998 | Mitchell |
| 5,741,036 | A | | 4/1998 | Ring |
| 5,918,922 | A | * | 7/1999 | Lathrop et al. ................ 294/55 |
| 5,921,596 | A | * | 7/1999 | Sheriff et al. ................ 294/1.4 |
| D427,735 | S | | 7/2000 | Hitchins |
| 6,312,029 | B1 | | 11/2001 | Renforth |
| 6,578,807 | B1 | | 6/2003 | Lipscomb |
| D485,025 | S | * | 1/2004 | Edwards et al. ............ D30/162 |
| 6,928,956 | B2 | | 8/2005 | Parr |
| 7,047,907 | B1 | | 5/2006 | Johnston |
| 2002/0124813 | A1 | | 9/2002 | Rose |
| 2002/0149215 | A1 | | 10/2002 | McLaughlin |
| 2004/0227364 | A1 | | 11/2004 | Pain |
| 2005/0005869 | A1 | | 1/2005 | Fritter et al. |
| 2006/0156991 | A1 | | 7/2006 | Burns |

* cited by examiner

*Primary Examiner*—Dean J Kramer
(74) *Attorney, Agent, or Firm*—Erin Collins

(57) ABSTRACT

The present invention provides a thermoformed litter scoop comprising a generally concave scoop portion, and a handle portion attached to the scoop portion. The scoop portion has a bottom, sides and a rear and a plurality of openings therein. The openings are defined to allow the passage of litter granules therethrough. The handle portion has reinforcing ribs and the scoop portion has reinforcing ribs. The invention also describes a method of making a thermoformed scoop.

11 Claims, 6 Drawing Sheets

THERMOFORMED LITTER SCOOP

BACKGROUND OF THE INVENTION

1. Field of the Invention

The present invention relates to animal refuse scoops, and more particularly to scoops for use with clumping animal litter.

2. Description of the Related Art

Domesticated animals such as cats are often trained to use litter boxes for defecation and urination. These litter boxes are typically filled with some type of disposable litter, which is usually comprised of some sort of fine absorbent granules. A particularly useful type of disposable litter is a clumping litter, such as the type disclosed in U.S. Pat. App. 2005/0005869 to Fritter et. al. Clumping litter allows a user to clean the litter box by removing solidified clumps of litter that have been coagulated together by an animal's urine, or attached to wet/fresh fasces, to form a clumped mass.

To remove such clumped masses of litter, the user should, for hygienic reasons, preferably employ a litter scoop. Numerous animal refuse scoops are disclosed in the prior art. Recently, animal refuse scoops have been adapted to work particularly well with clumping litter in that these scoops provide openings to allow the non-clumped granules to fall through the scoop, and back in to the litter box. U.S. Pat. App. 2002/0124813 to Rose discloses a litter scoop having an adjustable width for any size litter box. This litter scoop has stiffening ribs bounding an interior sifting area and optionally extending up the handle area. U.S. Pat. No. 6,312,029 to Renforth discloses a scoop for clumping litter having a rake portion and a receptacle portion. U.S. Pat. D332,675 to Simon discloses a scoop with slots in the bottom, back, and sides. U.S. Pat. D387,514 to Savicki discloses a scoop with a large hollow handle. U.S. Pat. No. 4,969,675 to Zahrowski describes a scoop without slots having a central longitudinal rib and two marginal ribs surrounding the head. U.S. Pat. No. 5,238,277 to Robinson discloses a scoop with parallel ribs. U.S. Pat. No. 5,536,055 to Kohn discloses a scoop having an opening and surrounding walls. U.S. Pat. No. 5,741,036 to Ring discloses a scoop with a transverse barrier or rib. U.S. Pat. No. 7,047,907 to Johnston describes a scoop with a removable liner for the scoop section. This scoop solves the problem of maintaining a sanitary scoop, however the liners may be inconvenient to attach and use.

There is a need for a disposable scoop that is of inexpensive construction so that it is disposable, which allows maintaining hygienic conditions, and yet strong enough to strain through a litter box and capture and hold clumps of used litter. To overcome the problems of prior art litter scoops, which are generally not disposable, scoops of the present invention are designed to be inexpensive yet strong.

BRIEF DESCRIPTION OF THE DRAWINGS

The foregoing aspects and others will be readily appreciated by the skilled artisan from the following description of illustrative embodiments when read in conjunction with the accompanying drawings, wherein.

Figure 1:
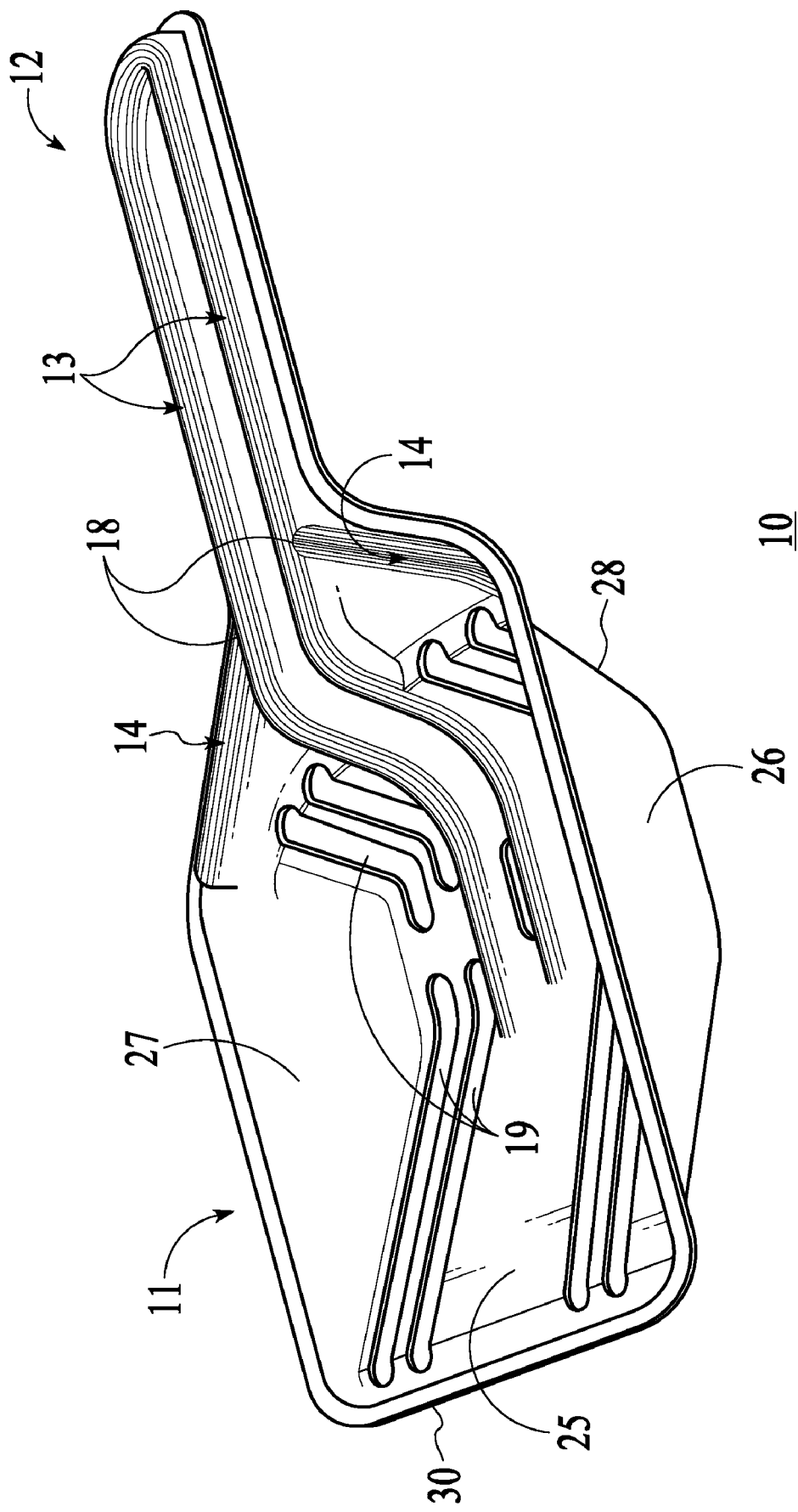
FIG. 1 is a perspective view of one embodiment of the present invention.

Reference will now be made to the drawings wherein like numerals refer to like parts throughout. As used herein, positional terms, such as "bottom" and "top" and the like, and directional terms, such as "up", "down" and the like, are employed for ease of description in conjunction with the drawings. Further, the terms "interior", "inwardly" and the like, refer to positions and directions toward the geometric center of embodiments of the present invention and designated parts thereof. The terms "exterior", "outwardly", and the like, refer to positions and directions away from the geometric center. None of these terms is meant to indicate that the described components must have a specific orientation except when specifically set forth.

Figures illustrating the components of this invention and the container show some conventional mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

SUMMARY OF THE INVENTION

In accordance with the above objects and those that will be mentioned and will become apparent below, one aspect of the present invention comprises a thermoformed litter scoop comprising a generally concave scoop portion having a plurality of openings that are large enough to enable litter particles to exit the scoop portion yet are small enough to retain clumps of litter in the scoop portion; a handle portion attached to the scoop portion at a scoop-handle connecting region; the scoop portion having a bottom wall, two side walls and a rear wall; the scoop having at least two handle supporting ribs extending along substantially the entire length of the handle portion and into the central portion of the scoop portion; and the scoop having at least two scoop supporting ribs extending outwardly in the handle-scoop connecting region along an upper portion of each side of the rear wall of the scoop portion.

In accordance with the above objects and those that will be mentioned and will become apparent below, another aspect of the present invention comprises a thermoformed litter scoop comprising a generally concave scoop portion having a plurality of openings that are large enough to enable litter particles to exit the scoop portion yet are small enough to retain clumps of litter in the scoop portion; a handle portion attached to the scoop portion at a scoop-handle connecting region; the scoop portion having a bottom wall, two side walls and a rear wall; and the scoop having at least two handle supporting ribs extending along substantially the entire length of the handle portion and into the central portion of the scoop portion.

In accordance with the above objects and those that will be mentioned and will become apparent below, another aspect of the present invention comprises a method of forming a litter scoop with sufficient rigidity comprising the steps of heating a plastic sheet; forming the plastic sheet in a single surface mold; cooling the molded plastic sheet, trimming the molded plastic sheet to form the litter scoop; wherein the plastic sheet is formed from a plastic from the group consisting of polypropylene or polyethylene and mixtures thereof, and the plastic sheet is molded to a thickness of; and the litter scoop comprises a generally concave scoop portion having a plurality of openings that are large enough to enable litter particles to exit the scoop portion yet are small enough to retain clumps of litter in the scoop portion; a handle portion attached to the scoop portion at a scoop-handle connecting region; the scoop portion having a bottom wall, two side walls and a rear wall; the scoop having at least two handle supporting ribs extending along substantially the entire length of the handle portion and into the central portion of the scoop portion; and the scoop having at least two scoop supporting ribs extending outwardly in the handle-scoop connecting region along an upper portion of each side of the rear wall of the scoop portion.

DETAILED DESCRIPTION OF THE INVENTION

Before describing the present invention in detail, it is to be understood that this invention is not limited to particularly exemplified systems that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference. The citation of any document is not to be construed as an admission that it is prior art with respect to the present invention.

As used herein, forms of the words "comprise", "have", and "include" are legally equivalent and open-ended and do not exclude additional unrecited elements, compositional components, or method steps. Accordingly, the term "comprising" encompasses the more restrictive terms "consisting essentially of" and "consisting of".

It must be noted that, as used in this specification and the appended claims, the singular forms "a," "an" and "the" include plural referents unless the content clearly dictates otherwise. Thus, for example, reference to a "surfactant" includes two or more such surfactants.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

In the application, effective amounts are generally those amounts listed as the ranges or levels of ingredients in the descriptions, which follow hereto. All percentages, ratios and proportions are by weight, and all temperatures are in degrees Celsius (° C.), unless otherwise specified. All measurements are in SI units, unless otherwise specified. Unless otherwise stated, amounts listed in percentage ("%'s") are in weight percent (based on 100% active) of the cleaning composition alone. It should be understood that every limit given throughout this specification will include every lower, or higher limit, as the case may be, as if such lower or higher limit was expressly written herein. Every range given throughout this specification will include every narrower range that falls within such broader range, as if such narrower ranges were all expressly written herein.

The term "plastic" is defined herein as any polymeric material that is capable of being shaped or molded, with or without the application of heat. Usually plastics are a homo-polymers or co-polymers of high molecular weight. Plastics fitting this definition include, but are not limited to, polyolefins, such as polyethylene and polypropylene, polyesters, nylon, vinyl, acrylic, polycarbonates, polystyrene, and polyurethane.

Litter Scoop

The thermoformed litter scoop of the invention is both inexpensive to manufacture and sufficiently rigid to perform as well as more expensive designs. Laundry scoops have been made from the thermoformed process. However, laundry scoops do not have slots or openings in the scoop portion because the purpose of laundry scoops is to convey the entire amount of laundry granules. Litter scoops require slots or openings to segregate non-clumped litter from clumped litter. This segregation process and the slots or openings in the scoop require increased torsional stability. The key to thermoformed litter scoop rigidity is the placement of ribs running along the handle and top of the scoop portion.

Thermoforming is a manufacturing process for thermoplastic sheet or film. The sheet or film is heated between infrared, natural gas, or other heaters to its forming temperature. Then it is stretched over or into a temperature-controlled, single-surface mold. Cast or machined aluminum is the most common mold material, although epoxy and wood tooling are sometime used for low volume production. The sheet is held against the mold surface unit until cooled. The formed part is then trimmed from the sheet. The trimmed material is usually reground, mixed with virgin plastic, and reprocessed into usable sheet. There are several categories of thermoforming, including vacuum forming, pressure forming, twin-sheet forming, drape forming, free blowing, and simple sheet bending.

The method for preparing a thermoformed article from polypropylene resin sheet (or polyethylene or other thermoplastic polymer) obtained by a typical thermoforming process includes but is not limited to the methods of forming articles in which preliminary heating step (with rolls or indirect heating) is provided prior to the thermoforming, of the pressure forming with a heating plate, and of the forming methods by indirect heating (e.g. vacuum forming method, pressure forming method). The temperature for thermoforming the polypropylene resin sheet depends on the forming methods, and the surface temperature of the sheet is usually in the range of 110 to 250° C., preferably 120 to 200° C. If the temperature is below the forming temperature range, the sheet will not be stretched satisfactorily and thus cannot be shaped into an article.

One example of the thermoforming process uses form keys for forming a reverse draft in a thermoformed part. The form key is part of a mold used to thermoform foam parts. The mold includes two halves, a first half with a forming cavity and a second half with a forming plug. A male form key is reciprocally mounted in the first mold half and reciprocates into and out of the forming cavity in response to engagement with a first drive pin which is reciprocally mounted in the first mold half and moved by engagement with the second mold half. A female form key is rotatably mounted in the second mold half and is rotated between a first and a second position upon engagement with a second drive pin mounted on the first mold half. The method of thermoforming parts includes placing a sheet between a forming cavity mold and a forming plug mold each including the male form key or the female form key as described above. Prior to thermoforming, the male form key is biased to a retracted position out of a cavity and the female form key is biased to a non-engaging position. The forming cavity mold and forming plug mold are then brought together. As this occurs, the male form key and female mold key are moved into the sheet forming an undercut or reverse draft in a part formed from the sheet. The forming cavity mold and forming plug mold are then moved apart. As this occurs, the male form key and female form key are moved away from the formed part and the formed part can be stripped from the forming cavity and plug molds while maintaining the undercut.

Figure 2:
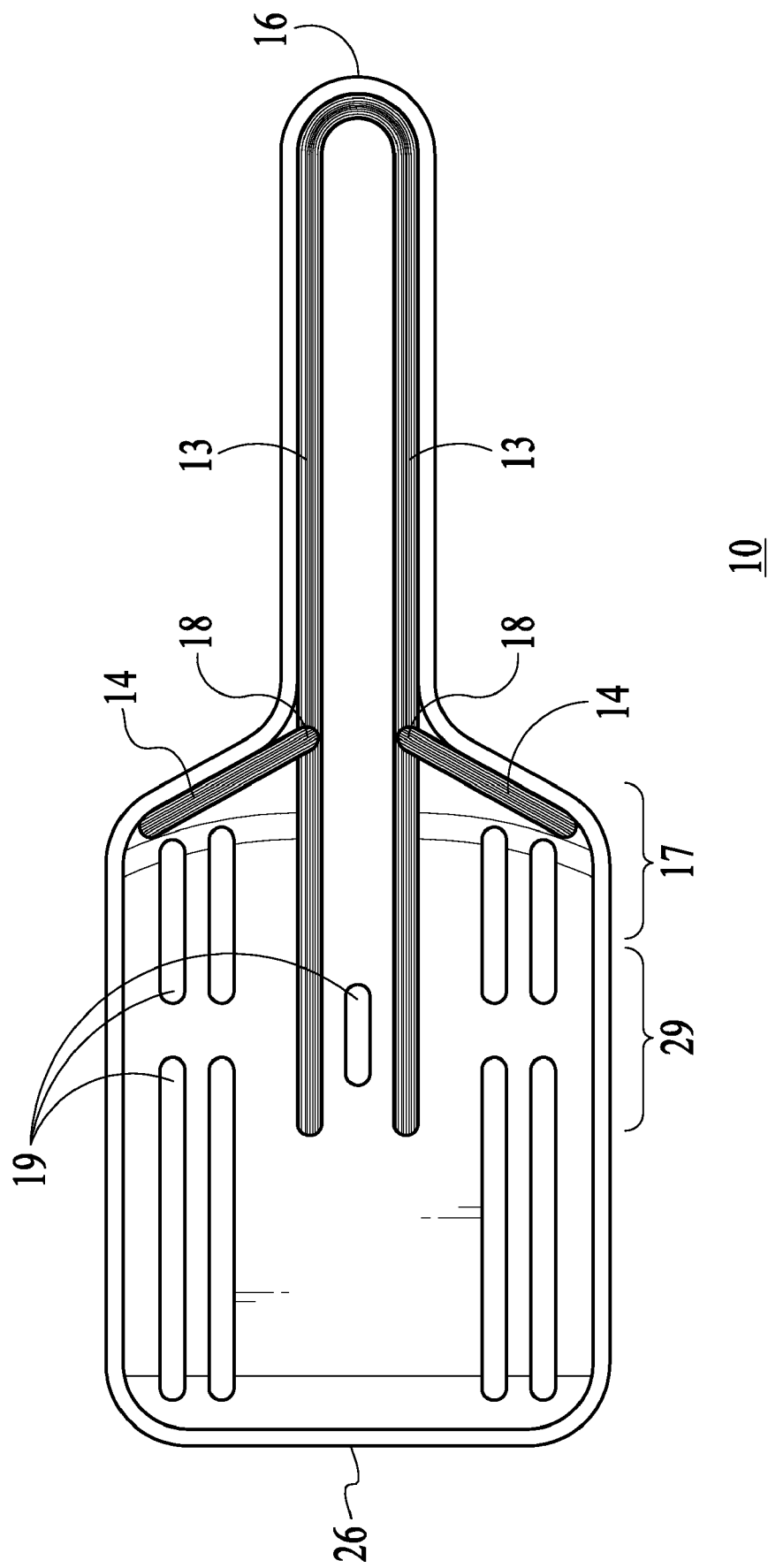
FIG. 2 is a top plan view of FIG. 1.
Figure 3:
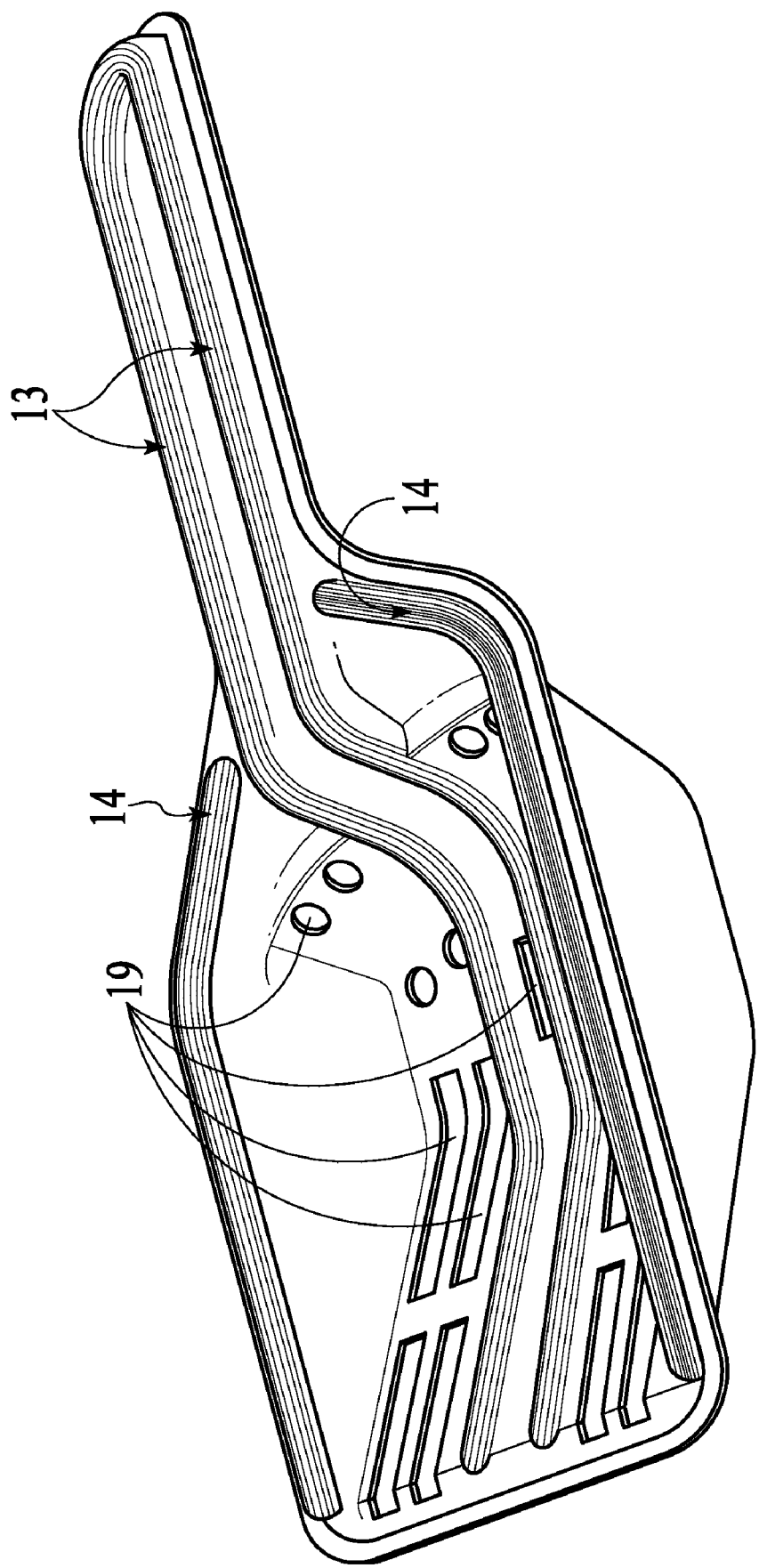
FIG. 3 is a perspective view of another embodiment of the invention.
Figure 4:
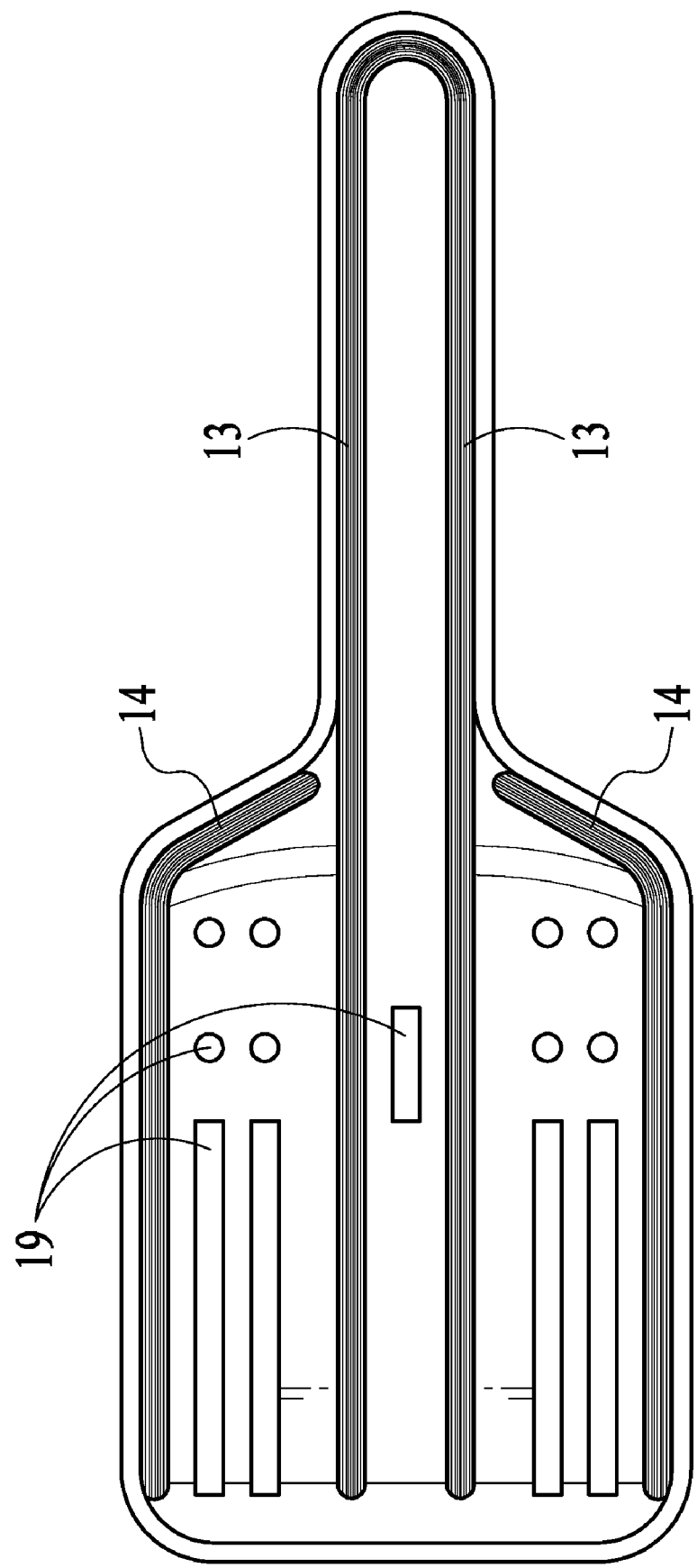
FIG. 4 is a top plan view of FIG. 3.

In accordance with the present invention, FIG. 1 shows a cat litter scoop 10 having a generally concave scoop portion 11 and a generally flat or rounded handle portion 12 attached to the scoop portion 11 at the scoop-handle connecting region 17 (FIG. 2). The scoop-handle connecting region 17 is generally rounded and generally does not contain a lip across the scoop portion rear wall 28. The scoop 10 suitably has at least two handle supporting ribs 13 and at least two scoop supporting ribs 14 to provide dimensional stability to the handle portion 12 and scoop portion 11. The handle supporting ribs 13 may be parallel and extend along substantially the entire length of the handle portion 12 and into the central portion 29 of the scoop portion 11. The handle supporting ribs 13 may extend only partially along the length of the scoop portion 11 and not to the scoop lip 30. The handle supporting ribs 13 may be connected together at the handle end 16. Each of the scoop supporting ribs 14 may connect into one of the handle supporting ribs 13 at a connecting point 18 and extend outwardly in the handle-scoop connecting region 17 along an upper portion of each side of the rear wall 28 of the scoop portion 11. The scoop supporting ribs 14 may also extend from the rear wall 28 along an upper portion of the side wall 26 or 27 (FIGS. 3 and 4). The scoop supporting ribs 14 may be tied into the handle supporting ribs 13 at a connecting point 18 (FIG. 2).

Figure 5:
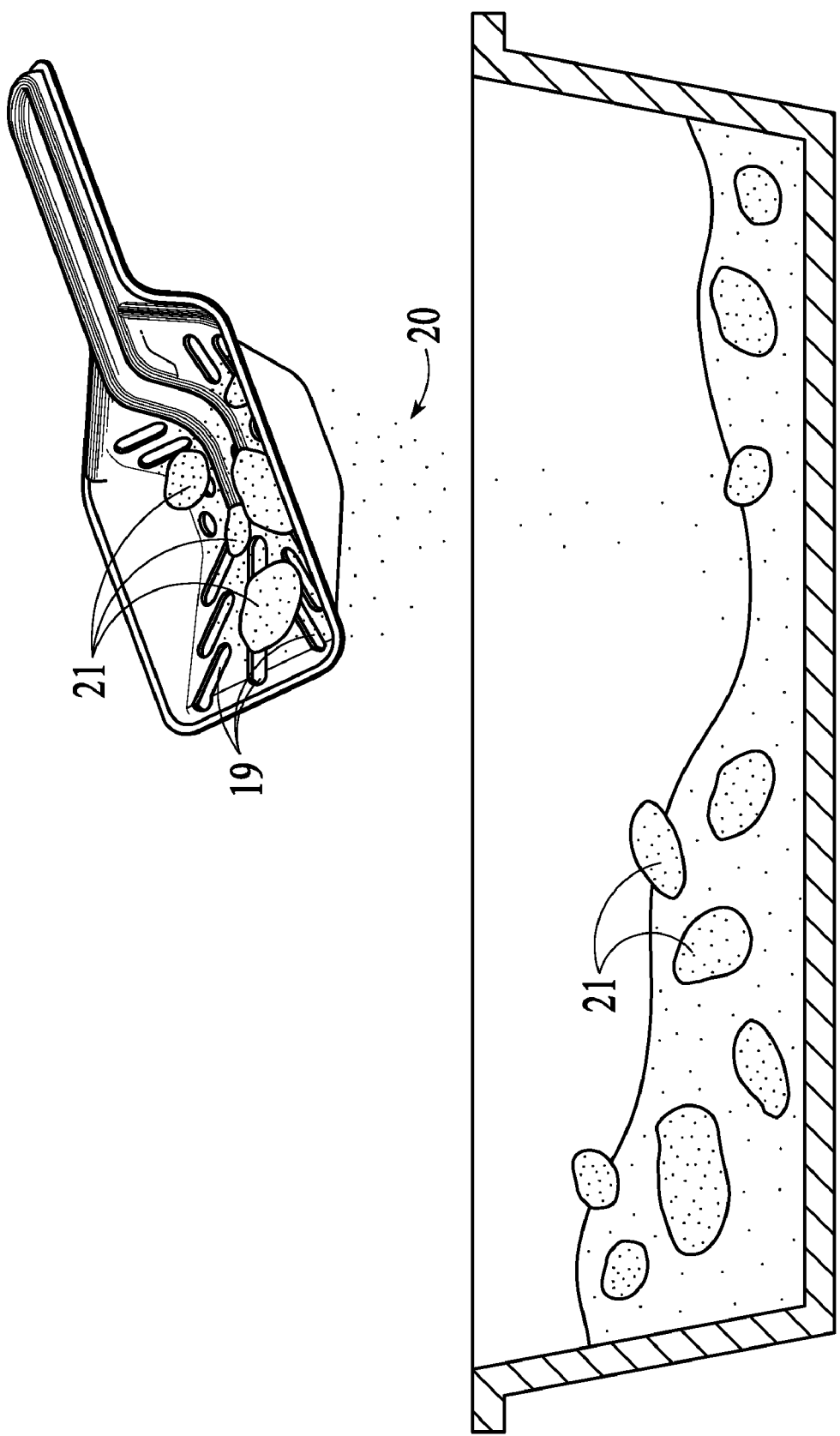
FIG. 5 is a longitudinal cross section through a typical litter box showing the litter scoop of the invention being used to separate the litter.
Figure 6:
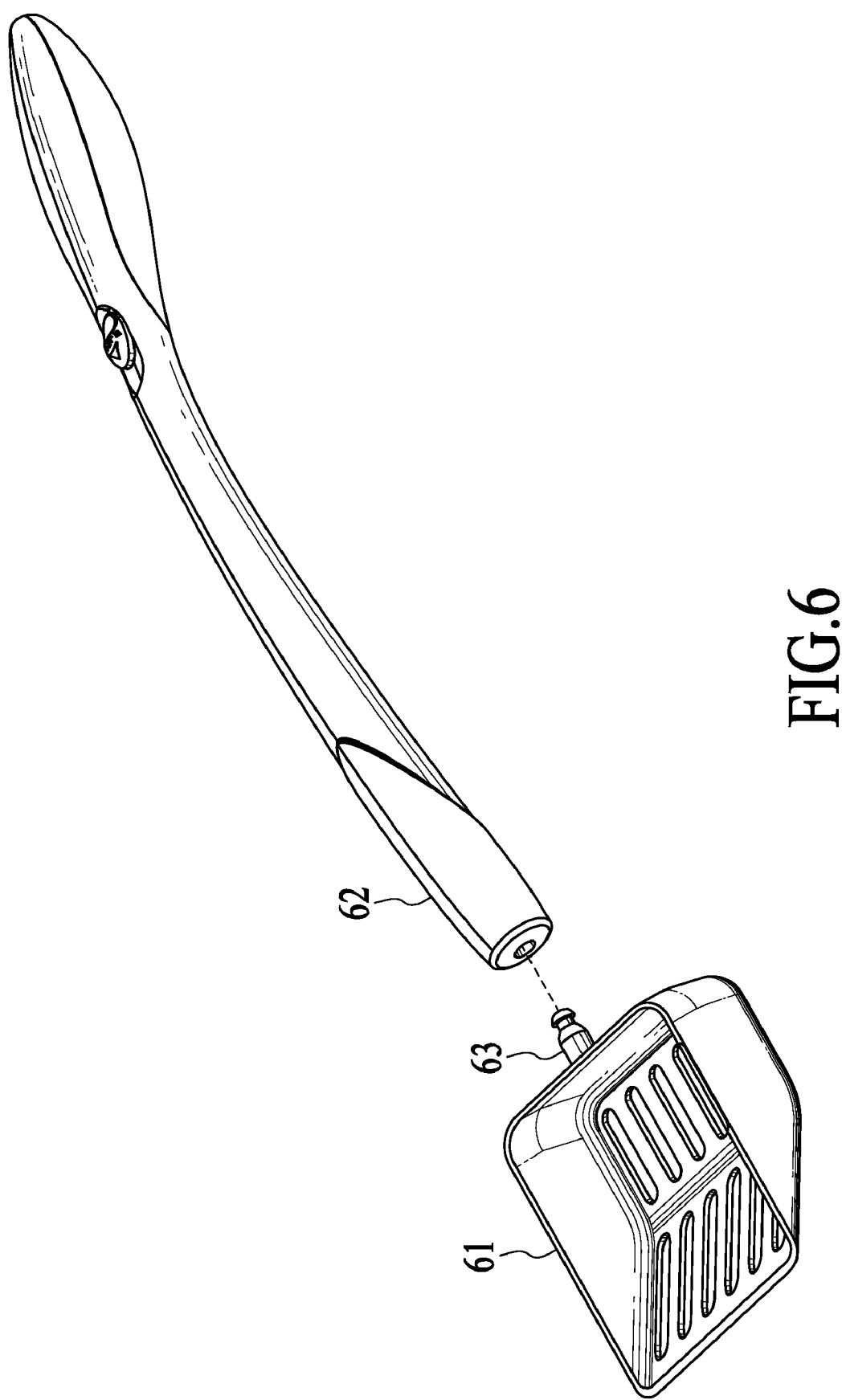
FIG. 6 is a perspective view of another embodiment of the invention.

The scoop portion 11 has a bottom wall 25, two side walls 26, 27, a rear wall 28, and a plurality of openings 19 therein (FIGS. 1 and 3). The openings are large enough to enable litter particles to exit the scoop portion yet are small enough to retain clumps of litter in the scoop portion (as shown in FIG. 5). The openings may be in the bottom wall only, or additionally in any of the side walls or rear wall. The openings 19 are defined to allow the passage of litter granules therethrough. The openings 19 can be rectangular or circular (FIGS. 3 and 4), oblong (FIGS. 1 and 2) or any other shape or orientation so long as they permit the passage of litter granules 20 therethrough and retention of the clumped litter 21 (FIG. 5). In another embodiment, the litter scoop in FIG. 6 has a detachable handle 62 which attaches to the scoop portion 61 by means of an attachment fitment 63.

While this detailed description includes specific examples according to the invention, those skilled in the art will appreciate that there are many variations of these examples that would nevertheless fall within the general scope of the invention and for which protection is sought in the appended claims.

We claim:

1. A thermoformed litter scoop comprising:
   a. a generally concave scoop portion having a plurality of openings that are large enough to enable litter particles to exit the scoop portion yet are small enough to retain clumps of litter in the scoop portion;
   b. a handle portion attached to the scoop portion at a scoop-handle connecting region;
   c. the scoop portion having a bottom wall, two side walls and a rear wall;
   d. the scoop having at least two handle supporting ribs extending along substantially the entire length of the handle portion and into a central portion of the scoop portion; and
   e. the scoop having at least two scoop supporting ribs extending outwardly in the scoop-handle connecting region along an upper portion of each side of the rear wall of the scoop portion and wherein the scoop supporting ribs additionally extend from the rear wall along an upper portion of the side walls.

2. The scoop of claim 1, wherein the handle supporting ribs are connected together at a handle end.

3. The scoop of claim 1, wherein at least one opening is rectangular.

4. The scoop of claim 1, wherein at least one opening is circular.

5. The scoop of claim 1, wherein at least one opening is oblong.

6. The scoop of claim 1, wherein at least one opening is on the bottom wall.

7. The scoop of claim 1, wherein at least one opening is on the rear wall.

8. The scoop of claim 1, wherein the handle supporting ribs are parallel.

9. The scoop of claim 1, wherein the handle supporting ribs extend only partially along the length of the scoop portion.

10. The scoop of claim 1, wherein the handle portion is generally flat.

11. A method of forming a litter scoop with sufficient rigidity comprising the steps of:
   a. heating a plastic sheet; forming the plastic sheet in a single surface mold; cooling the molded plastic sheet, trimming the molded plastic sheet to form the litter scoop;
   b. wherein the plastic sheet is formed from a plastic from the group consisting of polypropylene or polyethylene and mixtures thereof; and the plastic sheet is molded; and
   c. the litter scoop comprises a generally concave scoop portion having a plurality of openings that are large enough to enable litter particles to exit the scoop portion yet are small enough to retain clumps of litter in the scoop portion; a handle portion attached to the scoop portion at a scoop-handle connecting region; the scoop portion having a bottom wall, two side walls and a rear wall; the scoop having at least two handle supporting ribs extending along substantially the entire length of the handle portion and into a central portion of the scoop portion; and the scoop having at least two scoop supporting ribs extending outwardly in the scoop-handle connecting region along an upper portion of each side of the rear wall of the scoop portion and wherein the scoop supporting ribs additionally extend from the rear wall along an upper portion of the side walls.

* * * * *